Figure 1:
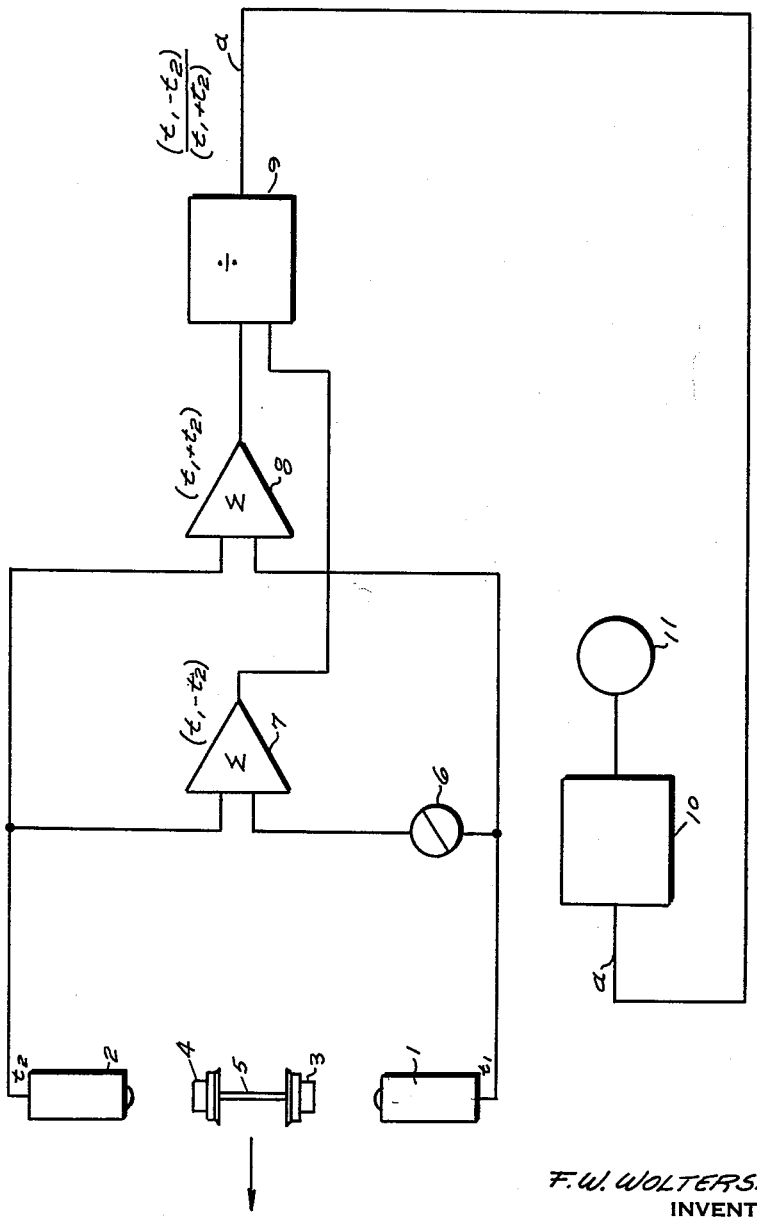

Aug. 6, 1963　　　F. W. WOLTERSDORF　　　3,100,097
METHOD FOR HOT BOX DETECTION
Filed Dec. 9, 1959　　　　　　　　　　　　　　　2 Sheets-Sheet 1

F.W. WOLTERSDORF
INVENTOR
BY Richard G. Stephens
ATTORNEY

Aug. 6, 1963  F. W. WOLTERSDORF  3,100,097
METHOD FOR HOT BOX DETECTION
Filed Dec. 9, 1959  2 Sheets-Sheet 2

F. W. WOLTERSDORF
INVENTOR
BY Richard D. Stephens
ATTORNEY

3,100,097
METHOD FOR HOT BOX DETECTION

Friedrich W. Woltersdorf, Braunschweig, Germany, assignor to Siemens & Halske, Aktiengesellschaft, Berlin and Munich, Germany, a corporation of Germany
Filed Dec. 9, 1959, Ser. No. 858,307
Claims priority, application Germany Dec. 15, 1958
7 Claims. (Cl. 246—169)

This invention relates to hot box detection, and more particularly to an improved method for detecting a hot box which is capable of distinguishing between an actual case of an excessively heated box and an indication which is ambiguous due to the fact that the hot box detector never actually knows whether it is detecting a roller bearing journal box or a sleeve type bearing journal box.

Hot box detectors are well known in the art wherein an infrared hot box sensing device detects infrared radiation from the journal box, which is directly proportional to the temperature of the journal box, and compares this temperature detection with the ambient temperature of the environment to ascertain whether or not the journal box is excessively heated (see for example "Electronics Pin-Point Hot Boxes," Railway Signaling and Communications, April, 1957). Friction in a bearing of a railway car, as in any other vehicle, leads to the generation of heat energy. In accordance with the well known law of heat dissipation, the rate of dissipation, in the temperature range concerned will be proportional to the temperature difference $$t = t_a - t_o$$

where $t$ = temperature of journal box above ambient, which equals the rate of dissipation of heat from the journal box
$t_a$ = absolute temperature of the journal box
$t_o$ = temperature of the outside surroundings, or ambient temperature The temperature of a journal box will rise until the dissipated heat equals the heat generated by friction. It follows from the above formula that for constant friction, maximum journal box temperature will depend upon the surrounding or ambient temperature. To determine reliably the degree of danger for the journal box bearing it is necessary in hot box detection to determine $t$, which determines the rate of dissipation, which is equal to $t_a - t_o$, rather than by merely measuring $t_a$, the absolute temperature, and conventional transducers do provide signals commensurate with $t$ rather than $t_a$. This is a very useful method of determining the absolute temperature of the journal box and its relation to the ambient temperature. And indeed this would be all the information that would be required if solely one type of journal bearing was in use for all railway cars. However, the fact is that both roller bearings and sleeve type bearings are utilized on railroad cars both in the United States and in foreign countries. It is characteristic of roller bearings that the allowable operating temperature range for its journal box may be substantially higher than the allowable operating range for the sleeve type bearing journal box. Accordingly an indication of a journal box temperature substantially in excess of the ambient temperature provides an ambiguous quantity since it may indicate either a hot box for the sleeve type journal box or it may indicate an allowable operating temperature for the roller bearing journal box. Sleeve type bearings typically operate with a normal temperature $t_n$ of 0 to 5 degrees centigrade above ambient and become critical or dangerous 15 to 20 degrees C. above ambient. Thus the permissible temperature variation for typical sleeve type bearings is approximately 15 degrees C. Roller type bearings, on the other hand, typically operate with a normal temperature $t_n$ from zero to 20 degrees C. above ambient, and become critical anywhere from 15 degrees to 80 degrees centigrade above ambient, with the amount of permissible variation increasing with the normal temperature, and thus the permissible temperature variation for typical roller type bearings may be as much as 60 degrees C. Thus not only is the normal temperature radiation $t_n$ greater for roller bearings, but also the permissible rise in temperature radiation is also greater.

It has been attempted recently to resolve this ambiguity. The method consists of utilizing two infrared detector units such that a detector unit is positioned on both sides of the track and they monitor respectively the journal boxes that pass on opposite sides of the track. In this way the temperatures of the two journal boxes that pass over the detecting unit are sensed simultaneously and may then be compared to ascertain the difference in the temperatures for the two boxes. Under the assumption that both of the bearings on the same axle will not be hot at the same time (simultaneous overheating is rare but does occur) it is possible, then, to ascertain whether one of the two boxes is excessively hot. Thus, if the temperature indications are similar or the same, i.e. the difference therebetween is zero or small, one can assume (within reasonably safe probability limits) that neither of the journal boxes is excessively hot, subject always to the condition of course, that the possibility exists that both of the journal boxes are excessively hot. This method is described in German Patent No. 1,031,338, and represents a constructive attempt to eliminate the need of transmitting information as to whether roller or sleeve bearing journal boxes are being sensed at the particular time.

It has been found, however, that this method, as described in the cited patent, is a reliable indication if, and only if, the characteristic temperature differences that occur between journal boxes on opposite sides of the axle are the same for roller bearings as for ordinary sleeve type bearings. The heat normally generated in a non-defective bearing, regardless of type, may be expressed by $$t_n = t_{an} - t_o$$

where $t_n$ = temperature above ambient and rate of heat generation of properly functioning axle box
$t_{an}$ = absolute temperature of the properly functioning axle box under normal conditions It is permissible to keep railway cars running without special attention to the bearing, even if temperature $t$ exceeds $t_n$ within a certain permissible variance in temperature, $t_p$, but at a critical temperature above ambient or heat generation rate $t_c$ above $t_p$, a critical condition will exist, which will damage the axle box and likely cause derailment. If the journal box generates heat at a rate proportionate to $t_c$ and the ambient temperature is $t_o$, the box will rise to temperature $t_{ac}$, or $$t_c = t_{ac} - t_o$$

It is desirable to provide a warning signal whenever $t$ exceeds $t_p$ and reaches $t_c$. However, not only is it the case that the operating range of a roller type bearing journal box is substantially greater than the permissible range for the sleeve type bearing journal box, but it is also the case that the temperature difference between two roller bearing journal boxes on the same axle is often times greater than the permissible difference between the temperatures of two sleeve type journal boxes on the same axle. Consequently, if the critical limit of temperature difference to be utilized for establishing hot box detection is fixed at too high a value, sleeve type bearing boxes which are excessively hot will not be detected. On the other hand, if the critical permissible level is set too low, safely operating roller bearing journal boxes will be improperly indicated as hot boxes. On the basis of practical experience it has been found that a more conservative fixing of the detection limit is preferable i.e., it is best to use a critical limit that is low such that the tendency is to indicate a hot box when in fact there is a safe roller bearing journal box temperature. This is done to insure that sleeve type journal boxes which are in fact excessively hot do not go undetected.

In general, the method utilized in the present invention comprises a system which reliably indicates, regardless of the type of journal box to be inspected, whether a critical condition exists. A detector is provided at each rail to monitor the temperature radiation $t$ of each journal box to provide electrical quantities $e_1$ and $e_2$ commensurate with $t_1$=temperature radiation $t$ of the left axle box, and
$t_2$=temperature radiation $t$ of the right axle box As mentioned above, the signals conventionally provided by such transducers are commensurate with the temperatures above ambient rather than the absolute journal box temperatures.

The electrical quantities representative of $t_1$ and $t_2$ are subtracted to provide a difference quantity $(t_1-t_2)$, and the quantities $t_1$ and $t_2$ are added to provide a sum quantity $(t_1+t_2)$. The ratio between the difference and sum quantities is then compared with a threshold quantity, $I_t$ to provide an output signal which will accurately indicate the existence of a critical condition, for journal boxes of either type.

For example, journal boxes having sleeve bearings might have a normal operating temperature 2 degrees centigrade above ambient, while roller bearing type journal boxes operating normally might have a normal operating temperature 18° C. above ambient, the exact temperature in either case depending upon train speed, lubrication conditions, and various other factors, such as the type of design. If a prior art hot box detector were adjusted to signal as abnormal all journal boxes that exceeded a temperature of 17° C. above ambient, it is evident that all abnormally warm sleeve bearing boxes would be properly detected. However, all properly functioning roller bearing journal boxes would erroneously be indicated as being abnormal.

With the present invention such anomalies do not occur. Assume that an axle having a pair of sleeve bearings passes the system of the present invention and that both bearings are at the same temperature, i.e., approximately 2° centigrade above ambient. The electrical signal generated by the present invention would be proportional to $$\frac{t_1-t_2}{t_1+t_2}=\frac{2-2}{4}=\frac{0}{4}, \text{ or zero}$$

If the two sleeve bearing boxes differed in temperature by slight amounts such that one box was 5° C. above ambient and the other was at 15° C. above ambient it will be seen that the output signal provided from the invention would be proportional to $$\frac{t_1-t_2}{t_1+t_2}=\frac{15-5}{15+5}=\frac{10}{20}=.5$$

It is further pointed out that the polarity of $I_t$ will indicate whether the defective box is the right or the left journal box.

If one journal box became abnormally warm and reached a temperature 17° C. above ambient and the other remained at a temperature of 2° C. above ambient, the output signal would be $$\frac{17-2}{17+2}=\frac{15}{19}=.79$$

Now, assume that an axle having a pair of roller bearing boxes passed the detector system of the invention. If both boxes were at a normal operating temperature of 18° C. above ambient, the output signal from the detector would be zero. If the boxes only slightly deviated from normal, i.e., 15° C. above $t_0$ and 25° C. above $t_0$ for example. the output signal provided would be proportional to $$\frac{15-25}{15+25}=\frac{-10}{40}=.25$$

If, however, one journal box became abnormally warm, 72° C. above ambient, for example, while the other box remained normal at 18° C. above ambient, the output signal would be proportional to 54/90 or 0.6.

Now it will be seen that if a system is arranged to operate an alarm when its output signal exceeds a threshold magnitude of 0.6, in either direction, it will properly indicate a dangerously abnormal condition for either an axle having sleeve bearings or an axle having roller bearings, but will not erroneously provide an alarm when either type of axle is at a safe temperature, even though the safe temperatures for the two different types of axles markedly differ. Now assume that the factors influencing the normal operating condition of bearings, such as an increased train speed, for example, develop a situation where the normal sleeve bearings would operate at 5° C. above ambient and normal roller bearings at 20° C. above ambient. If one sleeve bearing began to overheat and the other remained normal, the 0.6 threshold would provide an alarm when the overheated journal box reached a temperature of 20° C. above ambient if it is a sleeve bearing, but not until 80° C. above ambient if it is a roller bearing. Thus, the higher the normal operating temperature of a type of bearing, the greater the deviation from normal temperature will be allowed before signalling an alarm.

It is an object of this invention therefore, to provide an improved method for monitoring journal boxes which is more efficient in detecting journal boxes which are in actuality excessively hot.

It is another object of this invention to provide an improved method of detecting a hot box not subject to the defect of signalling a hot box when in fact a safe operating roller bearing journal box is being monitored.

It is still another object of this invention to provide an improved method for detecting hot boxes which is not subject to the defect of failing to indicate a hot box of the sleeve type bearing journal box when in fact the journal box is excessively hot.

Figure 2:
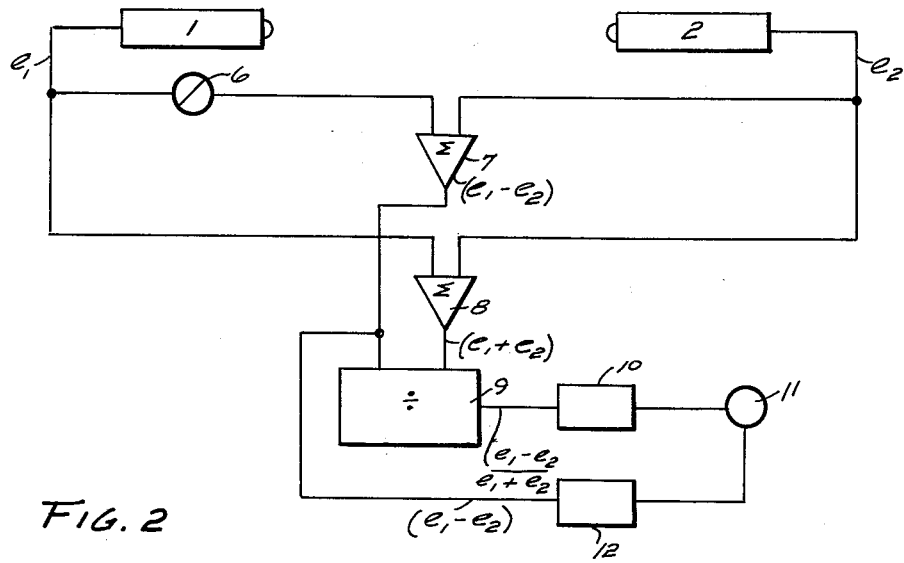
Figure 3:
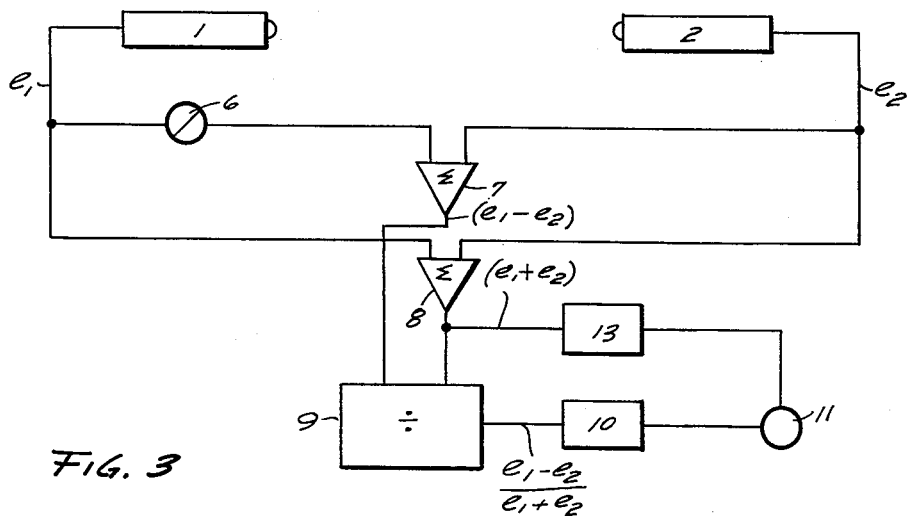

The above objects are achieved by the present invention in a method which is an improvement over that disclosed in the above-mentioned German patent. FIGURE 1 is a schematic illustration of the device embodying the subject matter of the present invention. FIGURES 2 and 3 are schematic illustrations of devices illustrating modifications of the present invention. Two infrared hot box detectors 1, 2 are used on opposite sides of the track to obtain information as to the temperatures $t_1$ and $t_2$ of the left and right journal boxes 3, 4 on a single axle 5 passing simultaneously over the monitoring point. The two temperatures thus ascertained are then utilized to obtain two fundamental pieces of information. The difference $(t_1-t_2)$ between the temperatures is obtained in the same manner as set forth in the above-mentioned German patent. Briefly, this is accomplished in the German patent by deriving two electrical impulses from the infrared radiation detectors; the magnitudes of the impulses are proportional to the temperatures $t_1$ and $t_2$ respectively. After inverting the polarity of one of the two impulses by means of inverter 6 they are fed into a summing circuit, e.g. a summing amplifier 7, and the output is then a difference impulse proportional $(t_1-t_2)$. In addition, in the present invention, the sum $(t_1+t_2)$ of the temperatures is also obtained by means of summing amplifier 8 in a similar manner to that of obtaining $(t_1-t_2)$ except that the polarities of the $t_1$ and $t_2$ impulses are left unchanged whereby $t_1$ and $t_2$ are combined in a circuit to provide a sum signal output rather than a difference signal. Then the difference signal is divided by the sum signal. This may be accomplished by any of the well known electronic analog division devices such as a servo-multiplier indicated at 9 in the drawing. While electronic analog division devices, summing amplifiers, and inverters have been well known to those having ordinary skill in the art for many years, it is pointed out that suitable examples of such elements which may be used in carrying out the instant invention may be found, for instance, in Electronic Analog Computers, Korn and Korn, Second Edition, McGraw-Hill Book Company, Inc., New York, 1956, Electronic Instruments, Greenwood, Holdam, and MacRae, First Edition, McGraw-Hill Book Company, Inc., 1948 (Radiation Laboratory Series, volume 21), and A Palimpsest on the Electronic Analog Art. George A. Philbrick Researches, Inc., 1955, pages 11 through 19. The magnitude of the quotient impulse thus obtained is then compared with an established critical level. This may be done, for example, by passing the quotient impulse through a discriminator stage 10 having a predetermined threshold, as is disclosed in the German patent for analysis of the difference impulse. If the magnitude of the quotient impulse is greater than the critical level there is an output from the discriminator stage to signalling means 11, thereby indicating a hot box. The polarity of the difference signal $(t_1-t_2)$ indicates whether it is the left or the right journal box that is hotter.

The significance of this method is now evident. Since the difference signal is permissibly greater in the case of roller bearings than in sleeve bearings, the use of the sum signal removes the ambiguity. Since the sum signal will be permissibly greater for roller bearings than for sleeve bearings, division by the sum signal in effect normalizes the difference signal of roller bearing journal boxes relative to sleeve bearing journal boxes.

The method of the present invention may be advantageously used in combination with the prior art method described above of comparing the temperature of each journal box with the ambient temperature. For example, the quantity representing $(t_1-t_2)$ or the quantity $(t_1+t_2)$ of the prior art may be compared with a second reference quantity representing a second threshold. FIGURE 2 illustrates a modification wherein a second discriminator stage 12 is provided to indicate that $(t_1-t_2)$ exceeds a second reference, and FIGURE 3 illustrates a second modification wherein a second discriminator stage 13 is provided to indicate the $(t_1+t_2)$ exceeds a second reference. Thus, in FIGS. 2 and 3, an alarm will be indicated if both the quotient quantity exceeds a first threshold and the difference quantity in FIG. 2 (or the sum quantity in FIG. 3) exceeds a second reference quantity. Inasmuch as FIGS. 2 and 3 are otherwise identical to FIG. 1, further explanation will be unnecessary. If it is arranged so that a hot box is indicated if, and only if, a hot box indication results from the method of the present invention and also from the prior art method, then false hot box indications or false absence of hot box indications would occur much more rarely than has heretofore been possible with the methods known in the art.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

What I claim is:

1. A method for detecting hot journal boxes irrespective of whether the journal boxes are of the roller bearing or sleeve bearing type comprising the steps of: monitoring the temperatures of the left and right journal boxes on an axle as said axle passes a monitoring point; obtaining a quantity commensurate with the difference beween said temperatures and a quantity commensurate with the sum of said temperatures; dividing said sum and difference quantities to obtain a quotient quantity; and comparing said quotient quantity with a predetermined reference quantity to provide an output alarm indication when the magnitude of said quotient quantity exceeds said predetermined reference quantity.

2. A method for detecting hot journal boxes utilizing infrared radiation to electrical impulse transducers for sensing temperatures, comprising the steps of: sensing the temperature $t_1$ of the left hand journal box on an axle as it passes a monitoring point and simultaneously sensing the temperature $t_2$ of the right hand journal box on said axle; comparing and operating upon $t_1$ and $t_2$ to ascertain which is greater in magnitude and to obtain a difference quantity commensurate with the magnitude of $(t_1-t_2)$; operating upon $t_1$ and $t_2$ to obtain a sum quantity commensurate with the magnitude of $(t_1+t_2)$; operating upon said difference quantity and said sum quantity to obtain a quotient quantity commensurate with the magnitude of $$\frac{(t_1-t_2)}{(t_1+t_2)}$$

comparing said quotient quantity with a reference quantity having a predetermined magnitude; and signalling a hot box if, and only if, said quotient exceeds said reference quantity in magnitude.

3. A method for detecting hot journal boxes which can accommodate both sleeve bearing boxes having a given statistically ascertained permissible operating temperature range and roller bearing journal boxes having a given ascertained permissible operating range which is greater than, and whose upper limit is greater than, that of said sleeve bearing journal boxes, comprising the steps of: monitoring the temperatures $t_1$ and $t_2$ of the left and right journal boxes on an axle as said axle passes a monitoring point; obtaining a quantity commensurate with the difference $(t_1-t_2)$ between said temperatures; obtaining a second quantity commensurate with the magnitude of $$\frac{t_1-t_2}{t_1+t_2}$$

comparing the two quantities with respectively fixed predetermined reference quantities; and signalling a hot box if, and only if, both the quantities exceed said respective reference quantities in magnitude.

4. A method for detecting hot journal boxes which can accommodate both sleeve bearing boxes having a given statistically ascertained permissible operating temperature range and roller bearing journal boxes having a given ascertained permissible operating range which is greater than, and whose upper limit is greater than, that of said sleeve bearing journal boxes, comprising the steps of: monitoring the temperatures $t_1$ and $t_2$ of the left and right journal boxes on an axle as said axle passes a monitoring point; obtaining first and second quantities commensurate respectively with these temperatures; combining said first and second quantities to provide a third quantity; comparing said third quantity with a first reference quantity; obtaining a fourth quantity commensurate with the magnitude of $$\frac{t_1-t_2}{t_1+t_2}$$

comparing said fourth quantity with a second reference quantity; and signalling a hot box if both said third quantity and said fourth quantity exceed said first and second reference quantities, respectively.

5. A hot box detecting system comprising a pair of heat sensor means adapted to be mounted on opposite sides of a railroad track and further adapted to produce first and second electrical signals in response to incident radiant energy emitted by passing journal boxes, electrical difference-determining means coupled to said first and second signals to provide a third signal commensurate with the difference in magnitude between said first and second signals, electrical adding means coupled to said first and second signals to provide a fourth signal commensurate with the sum of said first and second signals, electrical ratio forming means responsive to said third and fourth signals and operative to provide a fifth signal commensurate with the ratio between said third and fourth signals, and means responsive to said fifth signal to provide an output indication whenever the magnitude of said fifth signal exceeds a predetermined threshold magnitude.

6. Apparatus according to claim 5 in which the last stated means includes first and second discriminator circuits and an indicating device, said first and second discriminator circuits being connected to operate said indicating device whenever said fifth signal exceeds said predetermined threshold magnitude and said third signal exceeds a second threshold magnitude respectively.

7. Apparatus according to claim 5 in which the last-stated means includes first and second discriminator circuits and an indicating device, said first discriminator being connected to operate said indicating device whenever said fifth signal exceeds said predetermined threshold magnitude, said second discrimintor being connected to operate said indicating device whenever said fourth signal exceeds a second threshold magnitude.

References Cited in the file of this patent
UNITED STATES PATENTS

| | | |
|---|---|---|
| 2,809,290 | Kee | Oct. 8, 1957 |
| 2,963,575 | Pelino | Dec. 6, 1960 |

OTHER REFERENCES

S.H.A. German application 1,031,338, printed June 4, 1958 (Kl. 20 h1).